April 18, 1939.   A. A. LIEBELT   2,154,462

DOUGH CONTROL MEANS

Filed Nov. 6, 1937

INVENTOR.
Adolph A. Liebelt
BY
Murray Sackhoff Zugelter & Paddack
ATTORNEYS

Patented Apr. 18, 1939

2,154,462

UNITED STATES PATENT OFFICE 2,154,462

DOUGH CONTROL MEANS

Adolph A. Liebelt, Cincinnati, Ohio, assignor to The J. H. Day Company, Cincinnati, Ohio, a corporation of Ohio Application November 6, 1937, Serial No. 173,097

6 Claims. (Cl. 107—9)

This invention relates to a means for controlling the delivery of dough lumps in loaf form, from a dough sheeting and curling mechanism.

An object of the invention is to provide means in connection with the curling rolls of a dough working machine, whereby the dough masses in the form of spirally wound rolls are compelled to leave the machine in regular predetermined succession.

Another object of the invention is to provide means in association with the curling rolls of a dough working machine, whereby the machine may be adapted for turning out dough loaves of any desired size and weight, while at the same time maintaining a predetermined rate of loaf discharge as required by other dough working machines in a synchronized system.

Further objects of the invention are to provide for accomplishment of the above stated objects in a simple and effective manner, and without requiring expensive and complicated mechanism to be kept in repair and adjustment.

The foregoing and other objects are attained by the means described herein and disclosed in the accompanying drawing, in which.

Figures 1, 2:
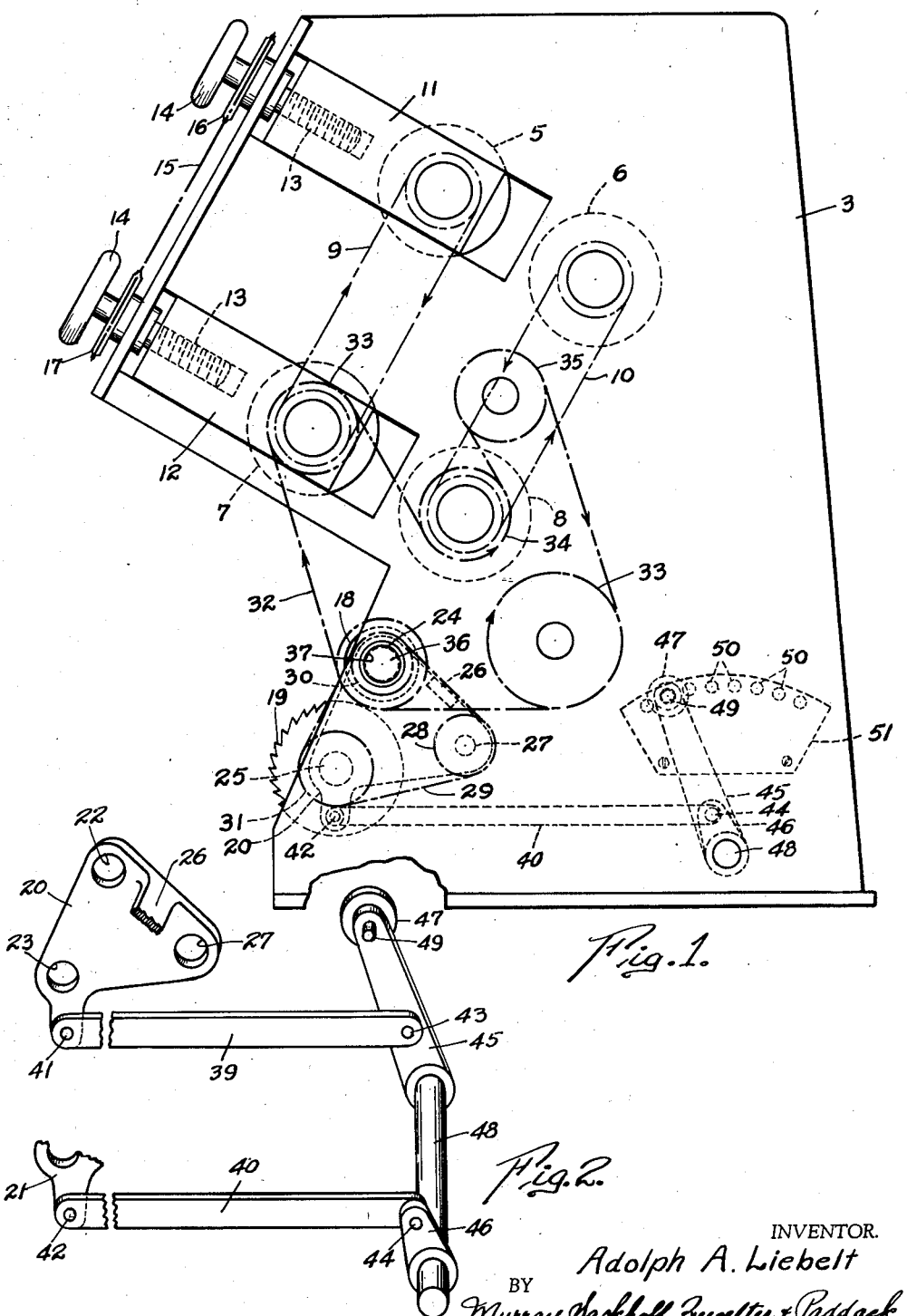
Fig. 1 is a side elevational view of a sheeting and curling head embodying the present invention, and adapted principally for application to a dough molder or elongator.
Fig. 2 is a perspective view, parts being broken away, showing a curling roll support frame and adjusting means therefor, all of which is shown in dotted lines in Fig. 1.

For a proper understanding of the present invention, it must be appreciated that modern baking establishments are operated upon a production basis, and accordingly, all machinery of the system, such as the sheeters, molders, dividers, ballers or rounders, proofers, and such others as may constitute the system, are required to operate in synchronism so that the baking of bread or other goods may be performed continuously and without interruption. To a great extent, bakery machine engineers have been able to maintain the necessary synchronization of dough movement through the system; however, serious interference with the regular operation of the system has been found to result in instances where the baker is unable, due to various conditions not within his control, to maintain a uniform consistency of the dough delivered by the mixer. A sticky dough does not behave in an expected fashion, nor does a dough which is too dry. Also, interference with a regular and expected movement of dough masses in the system, is experienced when the baker attempts to process dough lumps of different sizes and weights. In practice, the difficulties above mentioned have been found to have their inception in the dough molder and particularly in the region of the curling means of the molder. It is one of the purposes of the present invention to so construct the curling means for the sheeted dough that the variations in consistency, weight, and size of the dough lumps will be compensated for at the curling means.

With reference to the acompanying drawing: 3 indicates the head of a sheeting and curling mechanism which ordinarily is provided with a mounting flange 4 adapted to fit upon the bed of a dough molder or elongator. The head carries the dough sheeting rolls 5, 6, 7, and 8 which are driven in the directions indicated by arrows applied to the driving chains 9 and 10. By mounting the rolls 5 and 7 in adjustable bearing blocks 11 and 12 as indicated, said rolls may be moved towards and from the stationary rolls 6 and 8, for flattening or sheeting dough lumps fed thereto, and imparting to the dough sheets a desired thickness. As will be understood, the adjustment of the sheeting rolls may be accomplished by means of screws 13 or any other suitable means operating to advance and retract the bearing blocks 11 and 12. In the present embodiment, the adjustments are effected by means of hand wheels 14 attached to the screws, and compelled to rotate in unison by means of a chain 15 passing over sprockets 16 and 17. It is believed that the sheeting means requires no further explanation, as it is old in the art.

Below the sheeting means is located the means for curling the sheets advanced by the sheeting rolls, to produce a cylindrical loaf. In accordance with the present invention, the curling means comprises an upper horizontal curling roll 18 and a lower horizontal curling roll 19. These rolls have their opposite ends journaled in side plates 20 and 21, which side plates, together with the rolls, constitute a curling roll frame or unit. For the purpose of clarity of explanation, it may be assumed that the plates 20 and 21 are identical, each having a bearing 22 for an end of the upper curling roll 18, and a bearing 23 for the ends of the lower curling roll 19. The bearing ends of the rolls are indicated at 24 and 25 on Fig. 1. If desired, the plates 20 and 21 may be rigidly connected together in any suitable manner, such as by means of a cross-bar or brace 26; however, in practice, it is found that the rolls themselves serve to rigidify the curling unit. The third bearing, indicated at 27, is adapted to provide a mounting for an idler sprocket 28, which may be adjustable to take up stretch or wear in the chain 29 which passes over the sprockets 30 and 31 which are fixed upon the shafts of rolls 18 and 19, respectively. The entire curling roll unit may be driven in any suitable manner, such as by means of a chain 32 driven by a prime mover or sprocket 33. This same chain may be passed over the sprocket 33 which drives roll 7, and the sprocket 34 which drives roll 8. The sprocket 35 is an idler, which may be adjustable to compensate for changes in the tension of chain 32 resulting from adjustment of the bearing block 12 which rotatably supports the roll 7.

As will be observed by reference to Fig. 1, the bearing end 36 of the upper curling roll 18 extends through the side of the head 3, and rotates within a bearing 37 provided therein. The end of said roll is similarly supported at the opposite side of the head (not shown). Thus, it should be evident that the entire curler roll frame or unit, which comprises the curler rolls and plates 20 and 21, may be rocked or rotated about the axis of roll 18 while the curling means is in operation. Any suitable means may be employed for rocking the curler roll unit, as stated, and such means may be in the form of reciprocating members or links 39 and 40 having their forward ends pivoted as at 41 and 42 to the plates 20 and 21, respectively. The rear ends of the links may be pivoted, as at 43 and 44, to the cranks or levers 45 and 46. One or both of these levers may be extended and provided with a handle 47 to be grasped for rotating the shaft 48 to which both levers are fixed. The character 49 indicates a spring-urged pin or latch-piece, retractable by means of the handle or knob 47. The pin or latch-piece normally engages one of a series of depressions or notches 50 provided in an index plate 51 which is fixed to a side of the head 3. From the foregoing, it will be understood that withdrawing the pin or latch-piece 49 from a depression or notch 50, by means of the handle or knob 47, the lever 45 may be swung about the axis of shaft 48 for reciprocating the links or connecting members 39 and 40 in unison, thereby to rock the plates 20 and 21 and the rolls journaled therein, about the axis of the upper curling roll 18. It is to be distinctly understood that any other form of means for rocking the curling roll unit or frame will suffice. Also, it is not intended that the fulcrum or rocking axis of the curler roll unit, must necessarily be the axis of roll 18. In this connection, it should readily be evident that the plates 20 and 21 may be rocked upon studs extending therefrom at a location near the bearings of the upper curling roll, in which case the ends of the upper curling roll would not extend through the opposite sides of head 3.

In the operation of the device, measured lumps of dough are fed to the upper sheeting rolls 5 and 6, and are advanced thereby through the sheeting rolls 7 and 8, which latter feed the resultant dough sheet downwardly into contact with the periphery of the upper curling roll 18. This roll, rotating in a clockwise direction of rotation, turns the leading edge of the dough sheet and operates thereon to form the sheet into a substantially cylindrical roll or loaf. The lower curling roll 19, which is preferably serrated or roughened, as shown, serves as a support for the roll of dough undergoing formation, and it also urges the loaf towards the upper curling roll, so that the latter may perform its curling operation. Upon completion of the curling operation, the formed roll or loaf is required to roll downwardly along the periphery of the lower curling roll 19, and away from the upper roll 18. The loaf thus displaced or delivered by the curling means, may be received by a dough molder or elongator, or by a conveyor, as desired.

As previously stated, it is of utmost importance that the curling means deliver a regular timed succession of loaves. This timed deliver, however, will not ordinarily result unless the dough lumps initially fed to the feeding rolls in timed succession, are of uniform consistency, weight, and size. The adjustable curling unit herein disclosed effectively compensates for those variations.

By way of example, let it be assumed that the relative positions of the curling rolls indicated in Fig. 1 provide for a proper timed delivery of large comparatively dry loaves of dough. In such case, the lower curling roll 19 furnishes just the proper amount of supporting area to keep the dough mass in contact with the upper curling roll, until the sheet is completely wrapped to loaf formation. As soon as the loaf is thus completely formed, it will roll forwardly along the periphery of the lower curling roll, and will displace itself by the action of gravity. Now let it be assumed that a smaller lump of dough be fed by the sheeting means. This smaller sheet will be curled as above explained, but due to its smaller diameter, and the fact that its center of gravity does not sufficiently overhang the axis of roll 19, such roll of dough will not promptly leave the curling means. In fact, it might even remain upon the lower curling roll and become entangled with the next sheet of dough fed by the sheeting means. Such smaller loaf of dough, however, may be compelled to behave in the proper manner, by operating the lever 45 to retract the lower curling roll and thereby diminish the effective supporting area thereof, so that the loaf will leave the curling means as soon as it has been formed. In fact, the function of the arrangement disclosed is to bodily shift the lower curling roll relative to the upper curling roll, towards and from a vertical plane passing through the axis of the upper curling roll. As will be evident, such bodily shifting of the lower curling roll may be performed either through an arc, by the means disclosed herein, or along a straight line which would assure such advancement and retraction of the lower curling roll as will vary the effective supporting area exposed to the dough lumps acted upon by the upper curling roll. It is therefore conceivable that the lower curling roll 19 may be supported in sliding bearings arranged as at 12, to advance and retract the roll for the purposes explained. The construction should suggest also the use of the shaft of the lower curling roll, rather than that of the upper curling roll, as a rocking pivot for the curling unit, since the effective loaf supporting area of the lower curling roll may be varied by shifting the upper curling roll above it, without materially affecting the proper reception of the dough sheets from the sheeting means.

It may be mentioned that the means of this invention makes possible such disposition of one curling roll relative to the other, as will effectively eliminate the well-known tendency of the dough roll to "hop" while undergoing formation at the curlers. This "hopping" of the dough roll has been very objectionable due to its tendency to cock the dough roll, that is, to displace it from a desired horizontal position, so that upon leaving the curlers the dough roll would enter the elongator with one end thereof in advance of the other. Upon leaving the elongator, such cocked dough roll was misshapen and unduly elongated, interfering with regular procedure in the system. The elimination of "hopping" is accomplished, in accordance with the present invention, by altering the effective loaf supporting area of the lower curler roll with respect to the size, weight, and consistency of the sheet fed to the curlers. The character of alteration of the loaf supporting area made possible by the means of this invention, results also in changing the slope of the loaf supporting area, so that there is gained the maximum of gravity assistance in displacing the dough rolls from the curlers upon completion of the curling operation.

It is to be understood that various modifications and changes may be made in the structural details of the device, within the scope of the appended claims, without departing from the spirit of the invention.

What is claimed is:

1. In a machine for forming rolls of dough, the combination of means for flattening the dough into sheet form and advancing the sheet edgewise, a rotating roll for contacting and turning a leading edge of the dough sheet to compel transformation of the advancing sheet into a cylindrical load, and means for controlling delivery of the loaf from the machine, comprising a loaf supporting complementary curling roll subjacent to the rotating roll and movable toward and from a plane passing vertically through the axis of the roll to diminish and increase the area of support for the loaf.

2. In a machine for forming loaves of dough, the combination of means for flattening and advancing a dough mass, a pair of curling rolls to receive and support the flattened sheet while rolling it spirally into cylindrical loaf formation, means for rotating said curling rolls, and means for controlling displacement of the loaf from the rolls, comprising mechanism for bodily shifting one of the said pair of rolls relatively to the other roll.

3. In a machine for forming rolls of dough, the combination of means for flattening the dough into sheet form and advancing the sheet thereby formed, a lower sheet curling roll to receive and support sheets fed thereto by the flattening means, an upper sheet curling roll, means for rotating the sheet curling rolls to spirally wind the sheets into loaf formation as the sheets are fed by the flattening means, and means for controlling delivery of the rolled loaves, said means including the lower sheet curling roll and cooperative means for bodily shifting it, toward and from a vertical plane which passes through the axis of the upper sheet curling roll.

4. In a machine for forming loaves of dough, the combination of means for flattening and advancing a dough mass, and means for receiving the flattened dough mass and rolling it spirally into cylindrical loaf formation, said last mentioned means comprising an upper horizontal curling roll and a lower horizontal curling roll, and means for rotating said rolls in a common direction of rotation, bearing brackets for supporting the ends of the rolls in spaced relationship and means for bodily shifting the bearing brackets about the axis of one of said rolls.

5. In a machine for forming loaves of dough, the combination of means for flattening and advancing a dough mass, and means for receiving the flattened dough mass and rolling it spirally into cylindrical loaf formation, said last mentioned means comprising an upper horizontal curling roll and a lower horizontal curling roll, and means for rotating said rolls in a common direction of rotation, bearing brackets for supporting the ends of the rolls in spaced relationship and means for bodily shifting the bearing brackets about the axis of the upper horizontal curling roll only, thereby to shift the lower curling roll bodily along an arc following the contour of the upper roll.

6. In a machine for forming loaves of dough, the combination of means for flattening and advancing a dough mass, a head for supporting said means in position to feed the flattened dough mass in a generally downward direction, and means for curling the flattened dough mass as it leaves the flattening means, said curling means comprising a frame including a pair of rolls and having side plates with pairs of roll bearings thereon, said bearings supporting opposite ends of the rolls, and means pivotally mounting the frame for rocking movement upon the head and about an axis parallel to one of the roll axes.

ADOLPH A. LIEBELT.